(12) United States Patent
Herrmann

(10) Patent No.: US 6,606,329 B1
(45) Date of Patent: Aug. 12, 2003

(54) DEVICE FOR DEMULTIPLEXING CODED DATA

(75) Inventor: Laurent Herrmann, Le Kremlin-Bicetre (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/356,598

(22) Filed: Jul. 19, 1999

(30) Foreign Application Priority Data

Jul. 17, 1998 (EP) .......................................... 98401820

(51) Int. Cl.[7] .................................................. H04J 3/04
(52) U.S. Cl. .................... 370/535; 348/390.1; 375/240; 382/243
(58) Field of Search ................................ 370/486–490, 370/535–537, 463, 419; 348/416, 390.1; 709/217; 382/243; 375/240.03, 240.16, 240.08, 240

(56) References Cited

U.S. PATENT DOCUMENTS

| 6,057,884 | A | * | 5/2000 | Chen et al. ................. | 348/416 |
| 6,092,107 | A | * | 7/2000 | Eleftheriadis et al. ...... | 709/217 |
| 6,233,356 | B1 | * | 5/2001 | Haskell et al. .............. | 382/243 |

FOREIGN PATENT DOCUMENTS

| EP | 0753954a2 | 1/1997 | ........... H04L/29/06 |
| EP | 984001602 | 1/1998 | |
| WO | WO9810591 | 12/1998 | ............ H04N/7/24 |
| WO | WO9921337 | 4/1999 | ........... H04L/29/06 |

OTHER PUBLICATIONS

"MPEG–4 Context and Objectives", By R. Koenen et al., Signal Processing Image Communication 9 (1997), May 1997, No. 4, pp. 295–304.

"MPEG–4 Overview", Coding of Moving Pictures and Audio, vol. ISO/IEC JTC1/SC29/WG11 N2323, pp. 1–55, XP002120014, Jul. 1998.

Avaro O., Herpel C., Signes J.: "MPEG–4 Systems, Overview and Architecture", Online, May 28, 1998, XP002120015, Retrieved from the Internet: <URL: http://garuda.imag.fr/MPEG4/syssite/syspub/docs/tutorial/>.

* cited by examiner

Primary Examiner—Hassan Kizou
Assistant Examiner—John Pezzlo
(74) Attorney, Agent, or Firm—Russell Gross

(57) ABSTRACT

The invention relates to a device for demultiplexing coded data corresponding to multimedia objects. The data is organized in a bitstream divided into individually accessible portions—for instance Access Units for an MPEG-4 compliant bitstream—themselves subdivided into smaller data entities—SL-packets in the cited example—which all the demultiplexing operations are applied to. The operations are mainly, for all the data received at the input of the demultiplexing device: reading and formatting of a buffer, extraction of successive Access Unit segments, progressive reconstruction of a complete Access Unit, transmission of the Access Unit to an output buffer or file.

4 Claims, 4 Drawing Sheets

DEVICE FOR DEMULTIPLEXING CODED DATA

The invention relates to a device for demultiplexing coded data available in the form of a bitstream corresponding to multimedia objects, and more particularly in the form of a bitstream compliant with the MPEG-4 standard.

BACKGROUND OF THE INVENTION

The MPEG-4 standard provides standardized ways to represent audio-visual objects (called AVOs) of natural or synthetic origin, to compose them together to create compound AVOs that form audio-visual scenes, to multiplex and synchronize the data associated with AVOs, and to interact with the audio-visual scenes generated or reconstructed at the receiver's end.

It may be recalled that, as shown in FIG. 1, an audio-visual scene, received by an MPEG-4 system such as described for instance in the document "MPEG-4: context and objectives", R. Koenen and al., Signal Processing: Image Communication 9 (1997), May 1997, No. 4, pp.295–304, is generally composed of several AVOs organized in a hierarchical fashion. The leaves of this hierarchical organization are primitive AVOs such as, in the case of the illustrated audiovisual presentation: a background, the picture of a talking person, the voice associated with that person, a 3D object present in the scene, and so on (of any type—text, graphics, . . . —and which may be either bi- or tridimensional). FIG. 1 also illustrates schematically how video and audio compositors process the scene before it is rendered and displayed for the user, who has then the possibility to interact with it.

The data associated with these AVOs are conveyed in one or more Elementary Streams (ESs), characterized by the quality of service they require for transmission and some other parameters. The so-called MPEG-4 System Layer Model, schematically depicted in FIG. 2, provides a common model on which all implementations of MPEG-4 terminals can be based. As shown in FIG. 3 that illustrates the major components of such an MPEG-4 terminal (at the receiver side), data streams coming from a network or a storage medium ("Transmission/Storage Medium", in FIG. 2; "Network Layer", in FIG. 3) in the form of TransMux Streams must be properly demultiplexed to recover the Elementary Streams. These Elementary Streams are then passed to the appropriate decoders in view of their decompression, and in order to reconstruct the original AVO (Primitive AV Objects). Decoded AVOs, along with scene description indications giving information on the composition of the concerned scene, are then used to compose and render the scene as described by its author (in a given hierarchical, interactive form). Also to the extent allowed by the author, upstream data (user events, class request, . . .) are sent back to the Network Layer in order to interact with the scene.

More precisely, the MPEG-4 terminal depicted in FIG. 2 is a multi-layer structure consisting of the three following layers: a TransMux layer 21, a FlexMux layer 22 and an Access Unit layer 23.

The TransMux layer 21, which designates any existing or future underlying multiplex functionality that is suitable to transport MPEG-4 data streams (thus allowing MPEG-4 to be used in a wide variety of operation environments), consists of a protection sublayer and a multiplexing sublayer (although it may not be possible to separately identify these sublayers in some TransMux instances, the protection sublayer has a specific interest for providing error protection and error detection tools suitable for the given network or storage medium). This layer, not defined in the context of MPEG-4, is in fact an interface to the network or the storage medium and allows to offer transport services matching the requested Quality of Service (QoS).

The FlexMux layer 22, completely specified by MPEG-4, consists of a flexible tool for interleaving data (one or more Elementary Streams into one FlexMux stream) and allows to identify the different channels for the data that have been multiplexed.

The Access Unit layer 23 allows for an identification of Access Units (video or audio frames, scene description commands, . . .) in Elementary Streams and a recovery of time base. It conveys therefore both time base information and time stamped Access Units of these Elementary Streams. It may however be noticed that each layer of the MPEG-4 demultiplexer of the terminal has to process successively the whole stream.

A first object of the invention is to propose a more general implementation of such a demultiplexer, allowing a full integration with the subsequent decoder.

SUMMARY OF THE INVENTION

To this end, the invention relates to a device such as mentioned in the preamble of the description and which is moreover characterized in that said bitstream is subdivided into individually accessible portions of the coded representation of said multimedia objects and all the demultiplexing operations carried out in said device are, before the decoding operations, successively applied, after a further subdivision of said portions into smaller basic data entities, to each of said small data entities.

Another object of the invention is, more particularly, to propose a demultiplexer allowing to maintain a fully MPEG-4 compliant architecture.

To this end the invention relates to a demultiplexing device in which said bitstream is compliant with the MPEG-4 standard and subdivided into so-called Access Units, said demultiplexing operations being successively applied to smaller data segments, called SL-packets, of these Access Units.

More precisely, the main steps of the demultiplexing procedure, applied to each of the successive data structures, will then be the following ones (a) reading and formatting of a buffer;

(b) extraction of segments of an Access Unit;

(c) test of complete reconstruction, or not, of an Access Unit from the previously extracted segments;

(d) transmission of each complete Access Unit to an output buffer or file;

(e) repetition of steps (a) to (d) until no more data are present at the input of the demultiplexer.

BRIEF DESCRIPTION OF THE DRAWINGS

The particularities and advantages of the invention will be now explained in a more detailed manner in relation with the following description and the accompanying drawings, in which.

DETAILED DESCRIPTION

Although the invention may be applied in a wider field of applications, it will be described in the case of the MPEG-4 standard. According to the MPEG-4 specifications, representations of multimedia objects are conveyed from source entities to destination entities in separate elementary streams. A specific layer—called Synchronization Layer, or Sync Layer, or SL- allows to adapt elementary stream data for communication and therefore provides inter alia timing and synchronization information. This layer provides for an encapsulation of each elementary stream, i.e. divides each elementary stream into one or more Access Units, which are individually accessible portions of the coded representation of a multimedia object and are the smallest data entities to which timing information can be attributed. An Access Unit may be itself divided into small basic data entities called SL-Packets each of which consists of a configurable header and a payload.

Figure 1:
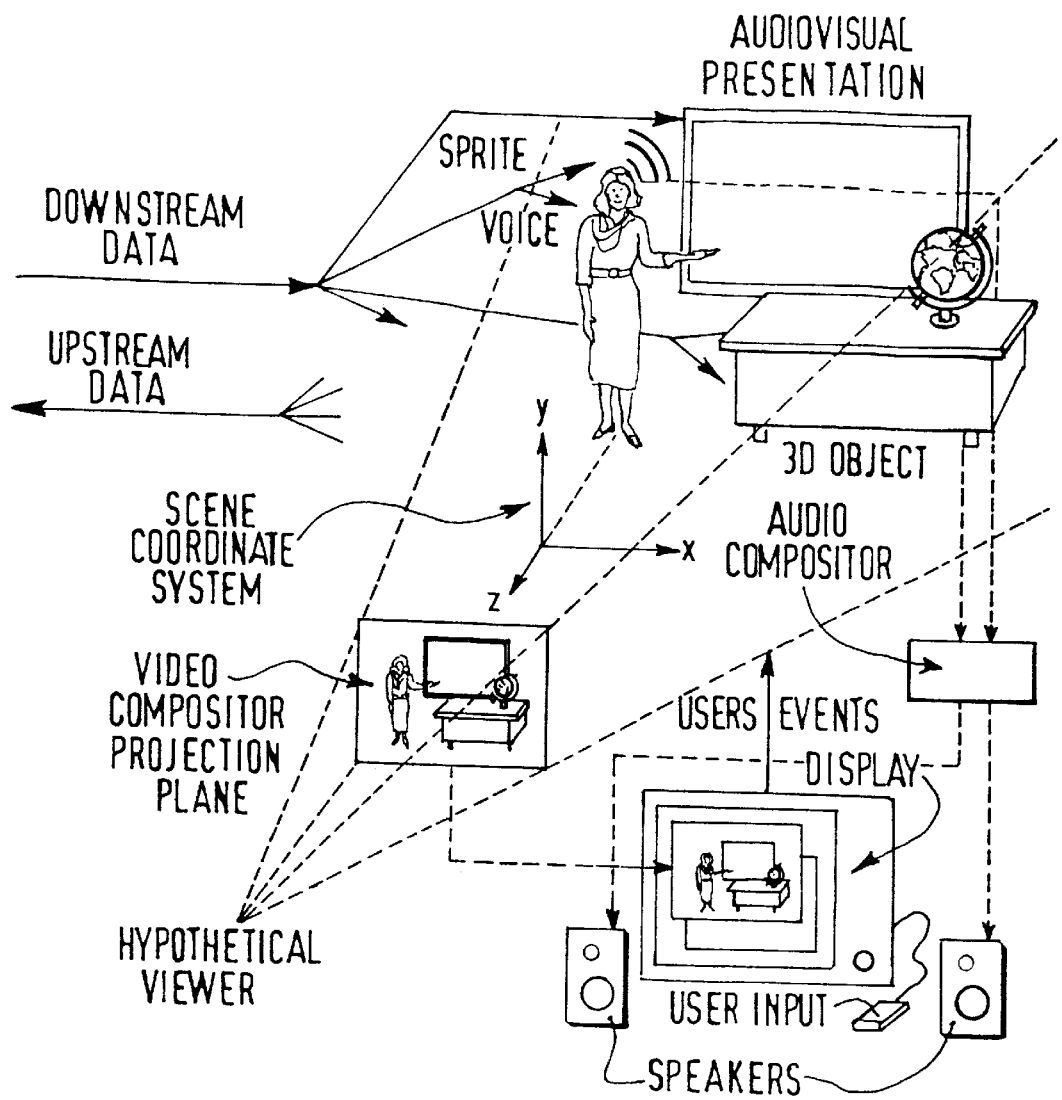
FIG. 1 illustrates an example of an object-based multimedia scene, as processed according to the MPEG-4 standard.
Figure 2:
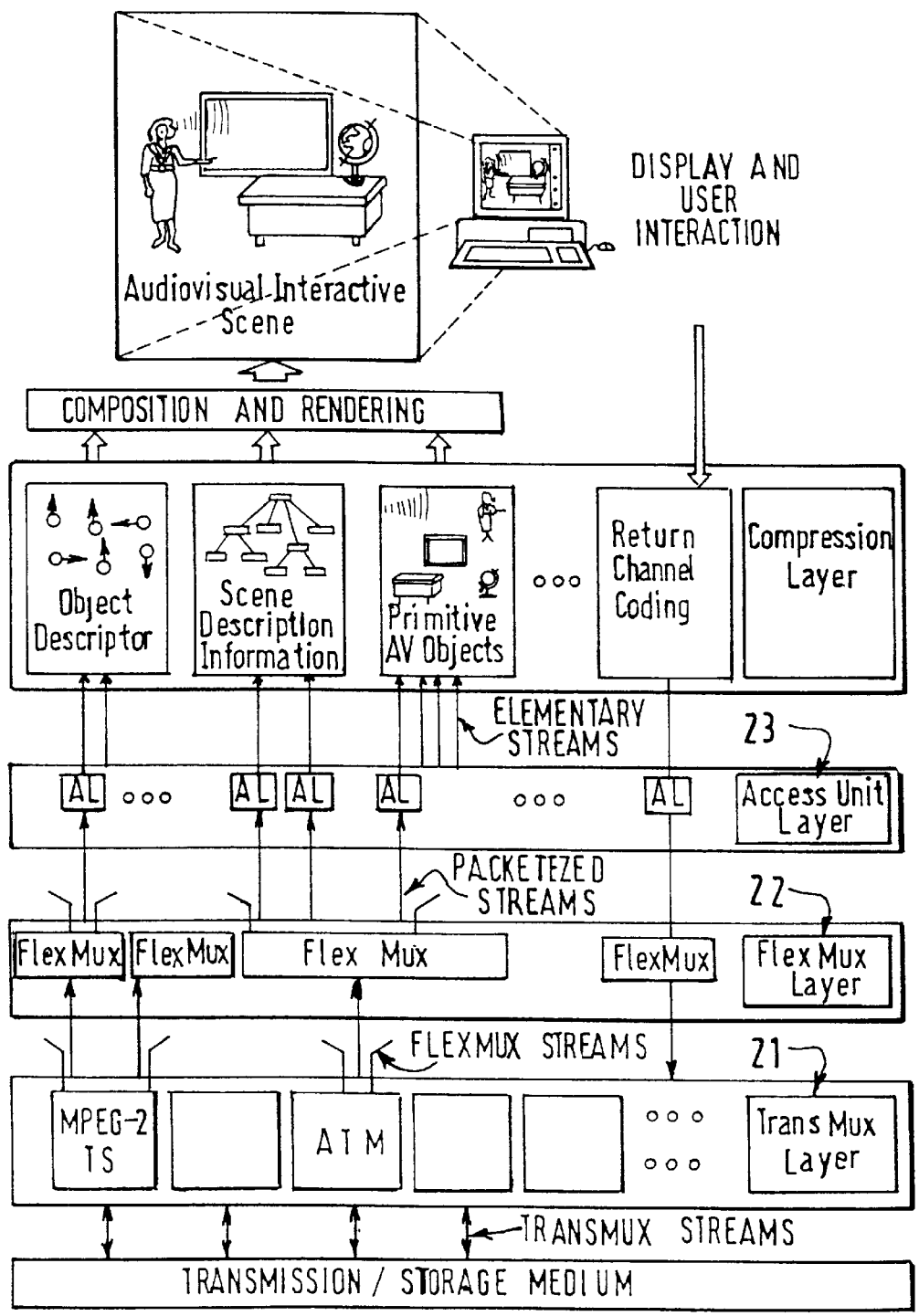
FIG. 2 depicts an MPEG-4 terminal structure allowing to process and reconstruct an audiovisual interactive scene, after a transmission and/or a storage of the corresponding MPEG-4 coded data.
Figure 3:
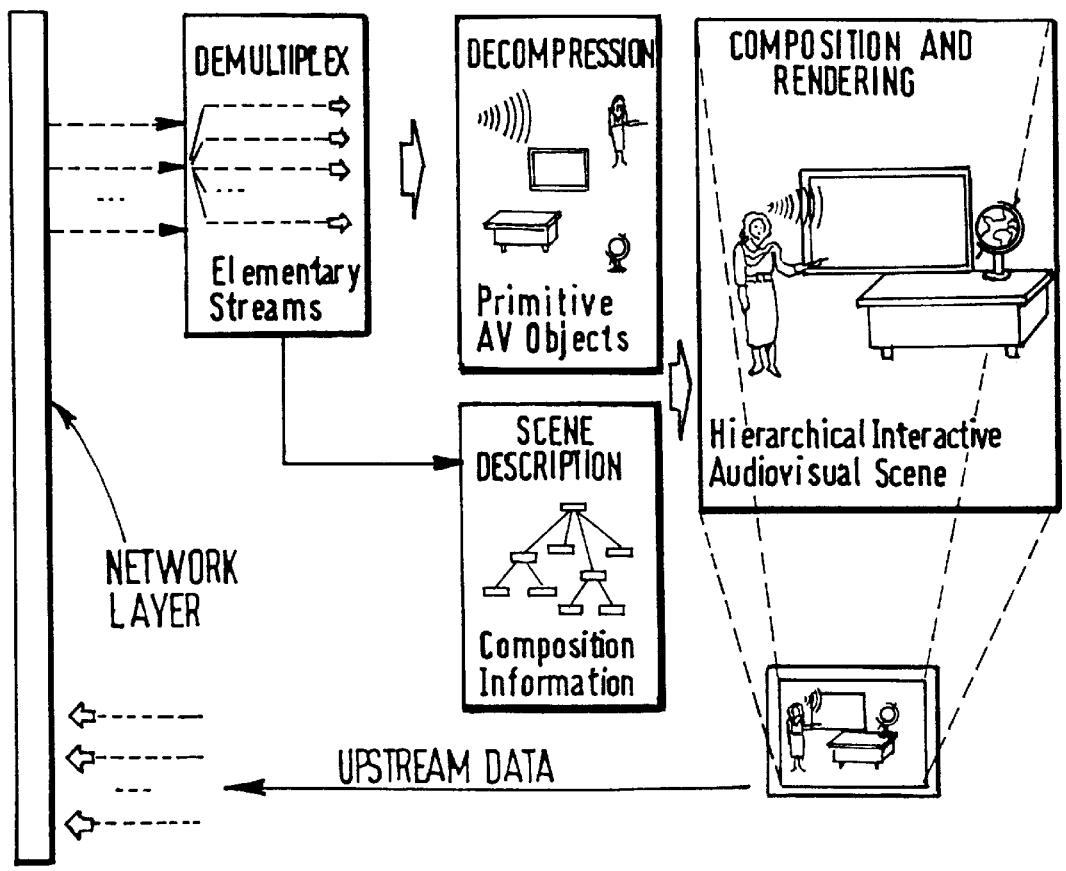
FIG. 3 shows the major components of an MPEG-4 terminal, at the receiver side.
Figure 4:
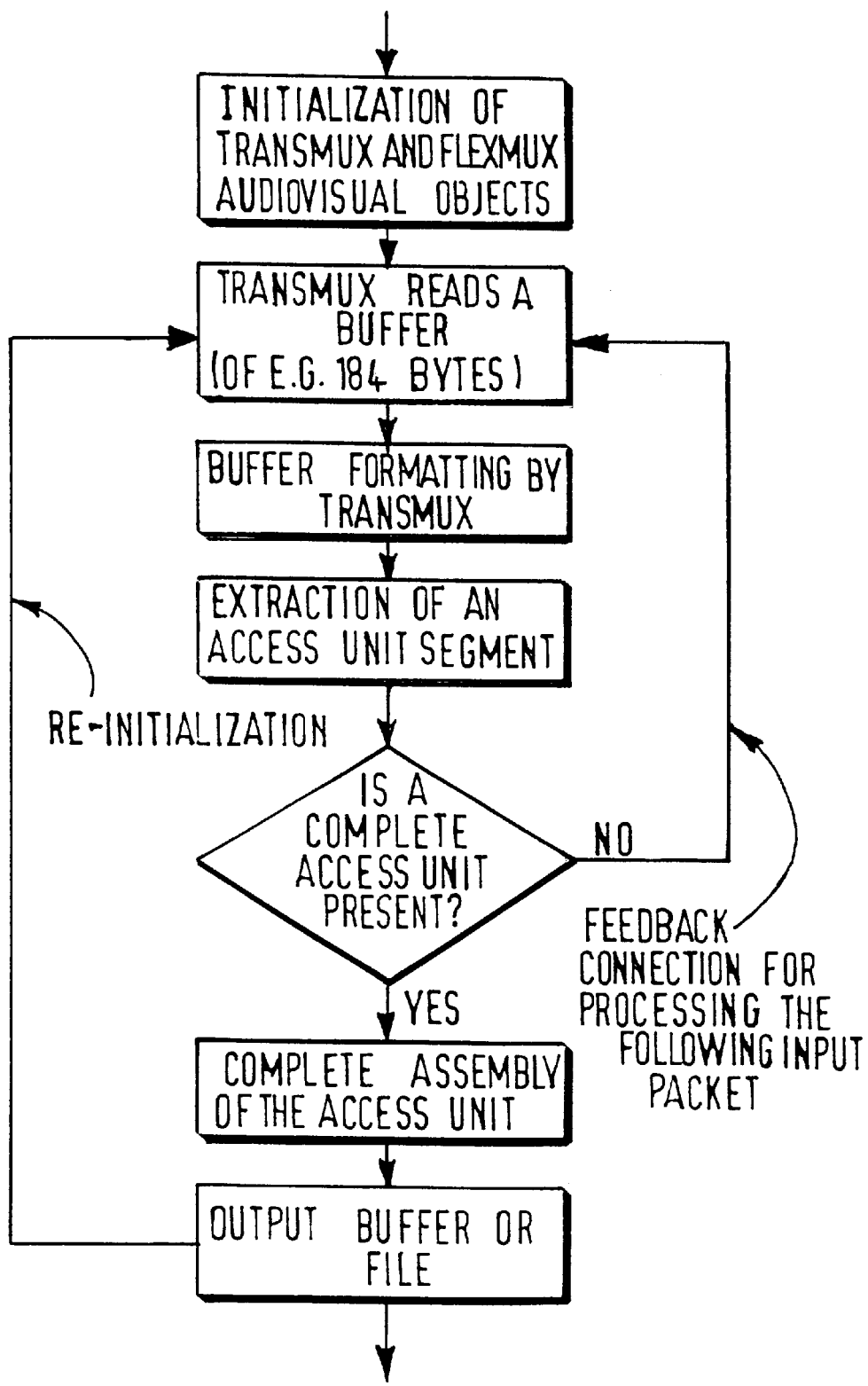
FIG. 4 illustrates the steps implemented in a demultiplexing device according to the invention.

In implementations proposed up to now, each layer of an MPEG-4 demultiplexer processes successively the whole stream, such as described for instance in the European patent application No. 98400160.2 (PHF98505). According to the invention, an MPEG-4 terminal with a real-time performance may be obtained if the demultiplexing operations are now processed for every piece of data the MPEG-4 demultiplexer receives. Basically, the different steps of the demultiplexing procedure are then the following ones, as depicted in FIG. 4:

(a) initialization of TransMux and FlexMux audiovisual objects;

(b) a buffer of a size corresponding to a payload length is read (for instance, this size may be of 184 bytes for the payload length of an MPEG-2 Transport Stream Packet);

(c) said buffer (that has been read) is then formatted to a FlexMux Protocol Data Unit (FMPDU) by the TransMux layer;

(d) the FlexMux layer receives said FMPDU and extracts the corresponding Synchronization Layer Protocol Data Unit (or SLPDU, such an SLPDU representing generally a segment of an Access Unit, as said above);

(e) the next step is a test: has an Access Unit been completely reconstructed from the previous concerned SLPDU segments, or not ?:

(e1) If an Access Unit has not been completely reconstructed, the MPEG-4 demultiplexer stores the data into a local buffer and re-starts the process with another input packet;

(e2) If a complete Access Unit, composed of all the concerned previous SLPDUs, is present, it is delivered to an output buffer or written into a file.

Said process is then re-initialized until no more data are present at the input of the demultiplexer.

The described demultiplexing device can be easily integrated on a programmable multimedia processor such as the processor designated with the reference TM-1000 (=TriMedia) manufactured by the company Philips, and its architecture is fully MPEG-4 compliant on said processor.

What is claimed is:

1. A method for demultiplexing coded data available in the form of a bitstream corresponding to multimedia objects, said bitstream is subdivided into individually accessible portions of the coded representation of said multimedia objects, further subdividing said portions in said bitstream into smaller basic data entities before performing demultiplexing operations, and demultiplexing operations carried out on said smaller basic data entities, before the decoding operations.

2. A method according to claim 1, wherein said bitstream is compliant with the MPEG-4 standard and subdivided into Access Units, said demultiplexing operations being successively applied to smaller data segments, called SL-packets, of the Access Units.

3. A method for demultiplexing coded data available in the form of a bitstream corresponding to multimedia objects, said bitstream is subdivided into individually accessible portions of a coded representation of said multimedia objects and demultiplexing operations carried out in said device are, before the decoding operations, successively applied, after a further subdivision of said portions into smaller basic data entities;

wherein said demultiplexing operations are, after an initialization of the elements of the demultiplexing device, carried out according to the following procedure:

(a) reading and formatting of a buffer;

(b) extraction of segments of an Access Unit;

(c) test of complete reconstruction, or not, of an Access Unit from the previously extracted segments;

(d) transmission of each complete Access Unit to an output buffer or file;

(e) repetition of steps (a) to (d) until no more data is present at the input of the demultiplexer.

4. A method for demultiplexing coded data in the form of a bitstream corresponding to multimedia objects divided into individually accessible portions:

(a) dividing the individually accessible portions into smaller segments;

(b) reading and formatting of a buffer;

(c) extraction of the smaller segments;

(d) test of complete reconstruction, or not, of an individually accessible portion from the previously extracted smaller segments;

(e) transmission of each complete individually accessible portion to an output buffer or file;

(f) repetition of steps (a) to (d) until no more data is present at the input of the demultiplexer.

* * * * *